US012609037B2

(12) United States Patent
Sacle et al.

(10) Patent No.: US 12,609,037 B2
(45) Date of Patent: Apr. 21, 2026

(54) COLLABORATIVE SPACE FOR MANAGING FLIGHT PLANS

(71) Applicant: THALES, Courbevoie (FR)

(72) Inventors: Jérôme Sacle, Toulouse (FR); François Terree, Toulouse (FR); Guy Deker, Toulouse (FR)

(73) Assignee: THALES, Courbevoie (FR)

( * ) Notice: Subject to any disclaimer, the term of this patent is extended or adjusted under 35 U.S.C. 154(b) by 281 days.

(21) Appl. No.: 17/776,545

(22) PCT Filed: Oct. 27, 2020

(86) PCT No.: PCT/EP2020/080126
§ 371 (c)(1),
(2) Date: May 12, 2022

(87) PCT Pub. No.: WO2021/094081
PCT Pub. Date: May 20, 2021

(65) Prior Publication Data

US 2022/0406198 A1 Dec. 22, 2022

(30) Foreign Application Priority Data

Nov. 14, 2019 (FR) ....................................... 1912712

(51) Int. Cl.
*G08G 5/26* (2025.01)
*G08G 5/34* (2025.01)

(52) U.S. Cl.
CPC ................. *G08G 5/34* (2025.01); *G08G 5/26* (2025.01)

(58) Field of Classification Search
None
See application file for complete search history.

(56) References Cited

U.S. PATENT DOCUMENTS 9,691,287 B1 6/2017 Shapiro et al.

*Primary Examiner* — James M Mcpherson
(74) *Attorney, Agent, or Firm* — Baker Hostetler

(57) ABSTRACT

A management of the elements of the context of one or more flight plans is provided. The systems, methods and computer programs allowing real-time collaborative work on and around one or more flight plans between multiple remote systems are provided. A first system comprises receiving a modification, made on a second system, to a flight plan and to a set of associated objects or to another set of non-associated objects, displaying the modification and, if the modification is validated, returning the modification, as applied to the first system, to the second system to ensure uniformity around the collaborative navigation space between remote parties.

17 Claims, 8 Drawing Sheets

COLLABORATIVE SPACE FOR MANAGING FLIGHT PLANS

CROSS-REFERENCE TO RELATED APPLICATIONS

This application is a National Stage of International patent application PCT/EP2020/080126, filed on Oct. 27, 2020, which claims priority to foreign French patent application No. FR 1912712, filed on Nov. 14, 2019, the disclosures of which are incorporated by reference in their entirety.

FIELD OF THE INVENTION

The present invention relates to the field of avionics, and more particularly to defining the management of aircraft flight plans and their context.

BACKGROUND

Flight plans are used to compute the trajectories followed by aircraft, and allow the various operators (pilot, air traffic controller, etc.) to evaluate, in advance, the path that will be followed by the aircraft. Flight plans are generally defined by a succession of waypoints, each waypoint generally being associated with a passage time and an altitude.

Conventionally, the pilot of an aircraft has a display of the flight plan, allowing him to visualize the current flight plan context, including the flight plan and the environment such as the weather, NOTAMs, traffic, airspaces, etc., but also to modify it. The modification may then be submitted to a flight management system, which checks that the modified flight plan will actually be flyable by the aircraft, and validates or does not validate the modification.

It is also beneficial for operators on the ground, notably GCC (Ground Control Center) centers, comprising air traffic control (ATC) centers and operations control centers (OCC), to know the context of the flight plan of the aircraft. In particular, operators and systems on the ground and on board have to be able to communicate with regard to the flight plan of the aircraft for various reasons: if the pilot modifies the flight plan, the GCC air traffic controllers have to be informed of this in order to be able to check that the new flight plan is actually compatible with the constraints of the airspace (for example with the trajectories of other aircraft, airspaces, etc.). Conversely, a GCC may ask the aircraft to modify the flight plan, for example in order to adapt to changes in air traffic in the current airspace or to operational needs of the operator. More generally, operators on the ground or on board may submit a modification to the flight plan.

Nowadays, the options for communications between the ground and on board include exchanging radio messages between the ground and on board. These messages may take the form of voice communications or data exchanges. Although these messages make it possible to submit modifications to the flight plan from the ground to on board, or vice versa, the possibilities for interaction remain limited.

Specifically, in current procedures, when modifications to the flight plan are requested, the flight plan is defined either on the ground by the GCC or on board, and the new flight plan is returned in full to the other party. This leads to multiple disadvantages. First of all, the volume of data exchanged is very large. This leads to latency in communications, and to congestion of the data channels between on board and the ground. In addition, the interaction between the ground and on board is limited: if a modification to the flight plan or to a computing parameter thereof is submitted by the ground or on board, the validation time for the modification will be large. Finally, these communications do not make it possible to ensure that an identical flight plan is shared in real time between the ground and on board.

The same problem arises more generally when multiple operators are working remotely on the flight plan of an aircraft. For example, multiple ATC or drone control centers may track the flight plan of a drone. The same problem regarding synchronizing the information on the flight plan of the drone then arises.

There is therefore a need for a shared workspace for visualizing and modifying a flight plan or a flight plan context of an aircraft interactively between multiple operators, specifically remotely and in real time.

SUMMARY OF THE INVENTION

To this end, one subject of the invention is a first system comprising: at least one display device configured so as to display a set of objects comprising a reference flight plan of the aircraft and at least one environment object or context object; at least one input interface; at least one communication port configured so as to communicate with at least one second system; at least one computing unit configured, upon receipt, via the communication port, of a message indicating a first description of a modification to said set, so as to: generate the display of the modification; receive a validation or a rejection of the modification via the input interface; send, via the at least one communication port, a message to the second system containing: in the event of validation, a second description of said modification; otherwise, an indication of the rejection of the modification.

Advantageously, the at least one computing unit is configured, upon receipt of a modification to the set of objects via the input interface, so as to: generate the display of the modification; send, via the at least one communication port, a message to the second system containing a first description of the modification; receive, from the second system, a message containing an indication of the rejection of the modification, or a second description of the modification; if the message received from the second system is a rejection message, or if the first and the second description are different, cancel the modification; otherwise, validate the modification.

Advantageously, the at least one environment object or context object comprises at least one object belonging to a type of objects chosen from a group comprising: an area of text; an information symbol; a closed surface; a pseudo-point on the reference flight plan; a graphical element; a flight plan section distinct from the reference flight plan.

Advantageously, the first system comprises at least one flight management system, and in which the at least one computing unit is configured: upon receipt of a modification to the reference flight plan by the at least one flight management system, so as to display the modification and send, via the at least one communication port, a message containing a description of the modified reference flight plan; if said modification to the set of objects received via the input interface is a modification to the flight plan, and is validated, send it to the flight management system.

Advantageously, the at least one computing unit is configured, upon receipt of a modification to the set of objects, so as to: check whether said modification to the reference flight plan involves an interaction between the modified reference flight plan and another object in the set; if the modification involves an interaction, create a functional object symbolizing the interaction.

Advantageously, the at least one computing unit is configured so as to: check whether the modification to the reference flight plan involves the modified reference flight plan moving to an existing or new closed surface; if the modification involves the modified reference flight plan moving to an existing or new closed surface, create a pseudo-point at where said flight plan enters the closed surface, and a pseudo-point at where said flight plan leaves the closed surface.

Advantageously, the at least one computing unit is configured, upon receipt of a modification to the set of objects, so as to: check whether said modification involves deleting the interaction between the modified reference flight plan and another object in the set; if the modification involves deleting the interaction, delete a functional object symbolizing the interaction.

Advantageously, the at least one computing unit is configured, upon receipt of a modification to the set of objects comprising the addition or the modification of an environment object or context object, so as to: check whether said modification involves an interaction between the reference flight plan and the added or modified environment object or context object; if the modification involves an interaction, create a functional object symbolizing the interaction.

Advantageously, the added or modified environment object or context object is an added or modified closed surface, and the at least one computing unit is configured so as to: check whether the modification involves the reference flight plan moving to the added or modified closed surface; if the modification involves the reference flight plan moving to the added or modified closed surface, create a pseudo-point at where said flight plan enters the added or modified closed surface, and a pseudo-point at where said flight plan leaves the added or modified closed surface.

Advantageously, the at least one computing unit is configured, upon receipt of a modification to the set of objects comprising the deletion of an environment object or context object, so as to: check whether said modification involves deleting the interaction between the reference flight plan and the deleted environment object or context object; if the modification involves deleting the interaction, delete a functional object symbolizing the interaction.

Advantageously, the at least one computing unit is configured so as to code an object prior to sending a message, and to decode an object following the receipt of a message, the coding of the object comprising: a code section comprising a predefined code defining the type of object, and for each of the attributes of the object, a predefined code defining the type of the attribute; an alphanumeric string defining the associated value for each of the attributes.

Advantageously, the at least one computing unit is configured so as to code a modification to the reference flight plan prior to sending a message, and to decode a modification to the reference flight plan following the receipt of a message, the coding of the reference flight plan modification comprising: a code section comprising a predefined code defining a modification to the reference flight plan, and for each of the modified flight plan functions, a predefined code defining the type of function; an alphanumeric string defining the modified waypoints and the associated parameter values for each of the functions.

Advantageously, the first and the second modification to the set are represented respectively in a first and a second coding of an object or of a modification to the reference flight plan; the at least one computing unit is configured so as to check whether the first and second modifications are identical by checking whether the first and second codings are identical.

Advantageously, the communication port is configured so as to communicate with a plurality of second systems; the computing unit is configured, upon receipt, via the communication port, of the message indicating the description of the modification, and in the event of validation, to send, via the at least one communication port, to each of the second systems of said plurality, the message containing the second description of the modification.

Another subject of the invention is a computer-implemented method comprising: receiving, via at least one communication port of a first system, configured so as to communicate with at least one second system, a message indicating a first description of a modification to a set of objects comprising a reference flight plan of an aircraft and at least one environment object or context object; displaying said modification on at least one display device of the first system; receiving validation or rejection via an input interface of the first system; sending, via the at least one communication port, a message to the second system containing: in the event of validation, a second description of said modification; otherwise, an indication of the rejection of the modification.

Another subject of the invention is a computer program comprising program code instructions stored on a computer-readable medium, said program code instructions being configured so as to: receive, via at least one communication port of a first system, configured so as to communicate with at least one second system, a message indicating a first description of a modification to a set of objects comprising a reference flight plan of an aircraft and at least one environment object or context object; display said modification on at least one display device of the first system; receive validation or rejection via an input interface of the first system; send, via the at least one communication port, a message to the second system containing: in the event of validation, a second description of said modification; otherwise, an indication of the rejection of the modification.

BRIEF DESCRIPTION OF THE DRAWINGS

Other features, details and advantages of the invention will become apparent upon reading the description provided with reference to the appended drawings, which are given by way of example and in which, respectively.

DETAILED DESCRIPTION

Figure 1:
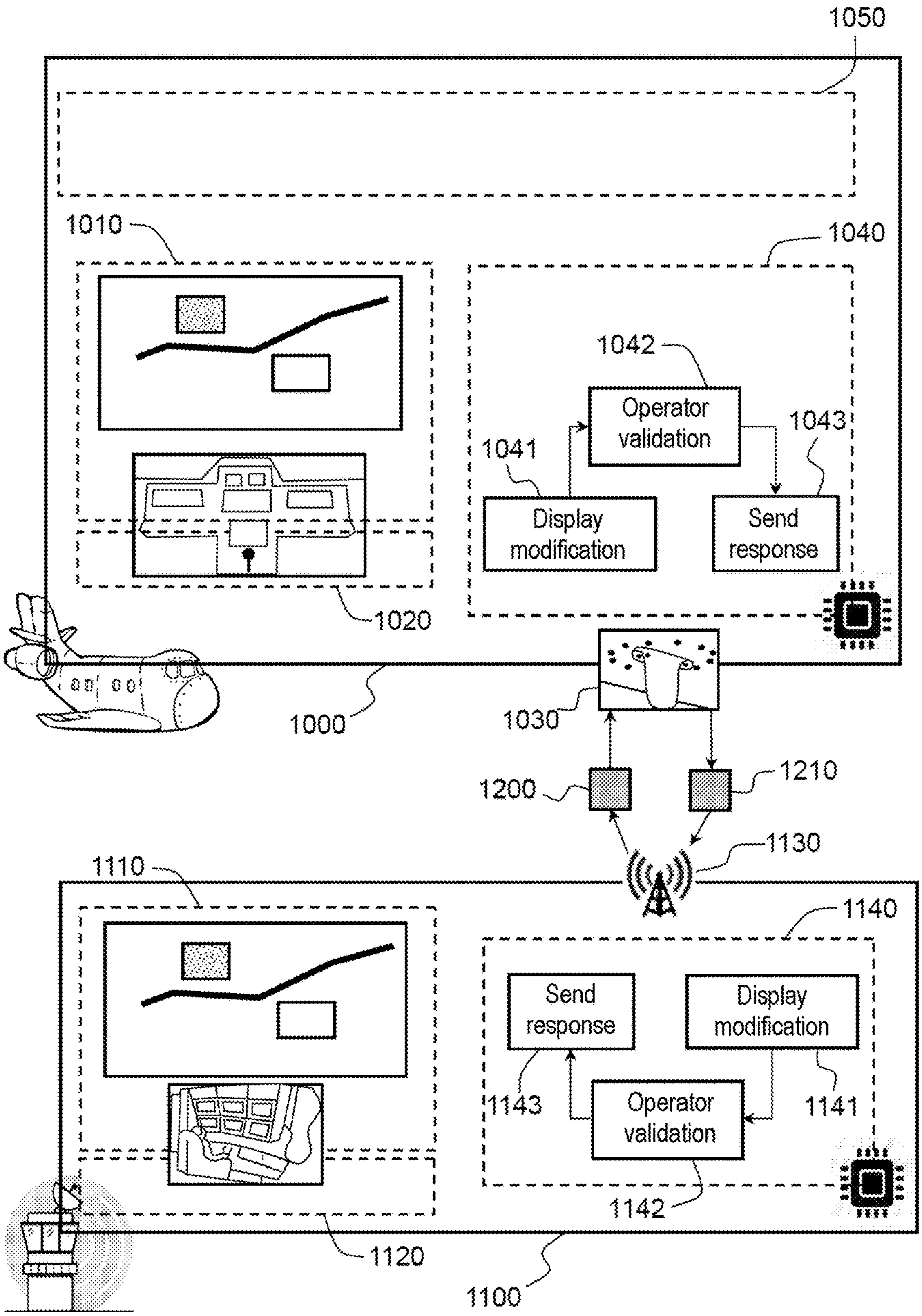
FIG. 1 shows an example of two systems collaborating on an interactive flight plan context according to one set of embodiments of the invention.

Certain acronyms commonly used in the technical field of the present patent application might be employed in the course of the description. These acronyms are listed in the table below, with notably their corresponding term and their meaning along with the definition of the main terms of the technical field of the invention.

| Acronym | Expression | Meaning |
|---|---|---|
| ACARS | Aircraft Communication Addressing and Reporting System | Coded communications system between an aircraft and the ground, defined according to ARINC standards. ACARS may notably be based on HF, VHF or SatCom links. |
| AFCS | Automatic Flight Control System | Autopilot system for automatically actuating the aircraft's actuators to achieve a trajectory provided at input. |
| ARINC | Aeronautical Radio, Incorporated | Company held by major American aerospace players known for defining the main communication standards inside aircraft and between aircraft and the ground. Refers both to the company and to the standards produced, for example the ARINC 429 and ARINC 661 standards. |
| ATC | Air Traffic Control | (ATC). Service provided by air traffic controllers on the ground to guide an aircraft to the ground safely. |
| ATN | Aeronautical Telecommunication Network | Network communication architecture allowing air and ground systems to communicate. |
| GCC | Ground Control Center | Generic definition of a flight mission management system located outside the aircraft (generally on the ground), which may be an air operations control center OCC (for a civilian or military air operator), an air traffic control (ATC) center or a drone control center. |
| CPDLC | Controller-Pilot Data Link Communications | Method of communication between controllers and pilots, defining a set of elementary messages able to be exchanged. These messages correspond to the procedures used for air traffic control. |
| EFB | Electronic Flight Bag | Electronic information management device allowing aircraft crew to perform flight management tasks more easily and efficiently, with less paper. |
| FL | Flight Level | In aeronautics, flight level designates an altitude expressed in hundreds of feet above the 1013.25 hPa isobaric surface. |
| FMS | Flight Management System | Computerized system for computing aircraft trajectories and flight plans, and for supplying suitable guide instructions for the pilot or autopilot to follow the computed trajectory. |
| FPL | Flight Plan | |
| HF | High Frequency | Radio frequencies between 3 and 30 MHz. |
| MMS | Mission Management System | Mission system allowing the pilot of an aircraft to monitor the mission of the aircraft. |

-continued

| Acronym | Expression | Meaning |
|---|---|---|
| NOTAM | Notice to Airmen | Messages to air crew. Messages published by government air navigation control agencies for the purpose of informing pilots of infrastructure changes. |
| OCC | Operations Control Center | Center where all information of an airline converges in order to handle flight operations. |
| OFP | Online Flight Planning | Remote flight plan determination for an aircraft. |
| SatCom | Satellite Communication | Satellite links allowing messages to be exchanged between an aircraft and the ground, notably in oceanic areas. |
| VCS | Voice Communication Systems | Voice communication systems used in air traffic. |
| VHF | Very High Frequency | Radio frequencies between 30 and 300 MHz. |

FIG. 1 shows an example of two systems collaborating on an interactive flight plan according to one set of embodiments of the invention.

In the example of FIG. 1, the system 1000 is an on-board system of an aircraft, and the system 1100 is a ground control system (GCC) of air operations. The system 1000 thus controls the trajectory of the aircraft, whereas the system 1100 interacts with the system 1000, but is not able to directly control the trajectory of the aircraft. However, the systems 1000 and 1100 are given only by way of example. According to other modes of implementation of the invention, the system 1000 is able to control the trajectory of an aircraft remotely; this may for example be a system for remotely controlling a drone. Likewise, the system 1000 is able to interact with multiple systems, for example multiple GCCs. The systems of the invention may more generally be systems allowing the flight plan of the aircraft to be visualized remotely, and allowing interaction with the first system. These may for example be operations control centers, for example control centers for maritime surveillance drones.

The invention may thus be applied more generally to any set of systems comprising a system able to visualize the flight plan context of an aircraft, and perform piloting based on the flight plan, and at least one system able to visualize the flight plan context and interact with the first system on this flight plan context.

The system 1000 may for example be an on-board system of an aircraft, comprising an EFB application, which may for example be a navigation and flight optimization application or an extended FMS having the ability to interface with the avionics, for example an FMS.

The system 1000 comprises at least one display device 1010 configured so as to display a first set of elements comprising a reference flight plan of the aircraft and, depending on the circumstances of the mission, objects of the context of the flight plan.

The display device may typically consist of one or more screens of the aircraft. This device displays at least one flight plan of the aircraft, but also objects that may influence the one or more flight plans. The objects may notably comprise:

- elements of the environment of the flight plan;
- elements of the environment or the context of the aircraft.

Some elements of the environment or the context of the aircraft may thus be both elements of the physical environment of the aircraft (for example a mountain, a danger zone, a waypoint, an airport, etc.) and context objects used for communication between on board and the ground (these may then be for example areas of text, pseudo-points on the trajectory, etc.). The invention is more generally applicable to any object that it may be beneficial to display in the context of exchanges of information between operators in connection with the navigation of an aircraft.

The first system 1000 also comprises at least one input interface 1020. This interface may comprise any type of interface able to receive input data from the operator (in this example, from the pilot of the aircraft).

The first system 1000 also comprises at least one communication port 1030 able to communicate with the system 1100. The communication port 1030 may typically comprise a VHF, HF or SatCom radio communication antenna and, if the system 1000 is an on-board system of an aircraft communicating with the ground, the communication may take place using the datalink protocol. The communication port 1030 is therefore able to send and receive messages with the system 1100.

The system 1000 finally comprises at least one computing unit 1040. The at least one computing unit 1040 may be any type of computing unit able to perform computations. For example, the computing unit may be a processor configured with machine instructions, a microprocessor, an integrated circuit, a microcontroller, a programmable logic circuit, or any other computing unit able to be programmed to perform computing operations.

The system 1100 may be a ground air operations (GCC) control system or, more generally, a system for remotely visualizing and modifying the flight plan context of the aircraft. The system 1100 may thus execute an OFP application connected to the flight plan generation tool of the operator. The system 1100 may also be connected to applications and tools, such as those relating to weather, to airspace flight information, in order to automatically integrate elements to be brought to the attention of the first system.

The system 1100 comprises at least one display device 1110 configured so as to display one or more flight plans and a set of objects associated with this or these flight plans. The display device 1110 may typically comprise one or more screens.

The system 1100 also comprises at least one input interface 1120, which may comprise any type of input interface allowing an operator to input data: keyboard, microphone, mouse, etc.

The system 1100 also comprises at least one communication port 1130 able to communicate with the system 1000. The communication port 1130 may typically comprise a radio communication antenna and, if the system 1000 is an on-board system of an aircraft communicating with the ground, the communication may take place using a datalink protocol. The communication port 1130 is therefore able to send and receive digital messages with the first system 1000.

According to various embodiments of the invention, various datalink protocols may be used. The datalink protocols known as ACARS or ATN may notably be used to transmit data between the system 1000 and the system 1100.

The second system 1100 finally comprises at least one computing unit 1140. The at least one computing unit 1140 may be any type of computing unit able to perform computations. For example, the computing unit may be a processor configured with machine instructions, a microprocessor, an integrated circuit, a microcontroller, a programmable logic circuit, or any other computing unit able to be programmed to perform computing operations.

One of the objectives of the invention is to synchronize the first and second sets of objects in real time in order to allow the operators of the various systems to visualize the same flight plan and the same objects in real time, all while performing independent work on processing the sets of objects.

For this purpose, the systems 1000 and 1100 exchange messages via their communication ports 1030, 1130. To simplify FIG. 1, the messages sent from the system 1100 to the system 1000 are denoted 1200, and the messages sent from the system 1000 to the system 1200 are denoted 1210. Although FIG. 1 shows a single message 1200 and a single message 1210, the invention may be applied to exchanges of numerous successive messages between the system 1000 and the system 1100.

The flight plan and the associated objects may be created and modified in various ways: an operator, on the ground or on board, may make modifications, for example by proposing a modification to the flight plan, by adding an area of text, or by modifying or adding an environment element, such as a no fly zone. A modification may also stem from a flight management system modifying the flight plan.

In the event of modification of a set of objects on one of the systems, a message describing the modification is sent to at least one of the other systems.

For example, if a modification to the second set of objects is made on the system 1100, a message 1200 describing the modification is sent by the system 1100 to the system 1000. Conversely, if a modification is made to the first set of objects from on board, a message 1210 describing the modification is sent from the system 1000 to the system 1100. In one set of embodiments of the invention, the messages are coded through a code system that makes it possible to define the objects, their statuses and attributes and their modifications. The messages may thus be coded and decoded transparently by the systems 1000, 1100. One example of coding and decoding objects is provided in FIGS. 7*a* and 7*b*.

Upon receipt of a message 1200, 1210 indicating a modification to the set of objects, the at least one computing unit 1040, 1140 is configured 1040, 1041 so as to generate the display of the modification. In order to clearly highlight the modification, this may be highlighted in various ways: extra brightness, in color, flashing, highlighting, underlining, pop-up, etc. This allows the operator of the system receiving the message to visualize the modification. Said operator may then use the input interface 1020, 1120 to validate or decline 1042, 1142 the modification.

If the modification is accepted, the set of objects is updated on the one or more systems that received the modification, on the ground or on board. Next, the at least one computing unit 1040, 1140 returns, to the other one or more systems, an update to the dynamic flight plan and the associated objects as actually implemented.

Finally, the at least one computing unit 1040, 1140 is configured so as to send, via the at least one communication port 1043, 1143, a message 1210, 1200 to the other systems, containing:

- in the event of validation, said modification to the dynamic flight plan and the associated objects, in order to ensure that the sending system and the receiving systems have an identical flight plan context and validate that there has not been any corruption;
- otherwise, an indication of the rejection of the modification.

In the request, the reference flight plan to which the modification has been made, after acceptance, will be called "modified reference flight plan". The term "unmodified reference flight plan" may also be used to denote the reference flight plan, either before modification or whose modification has been declined.

This process is subject to the modification rights of each of the systems. For example, the air operations ground control system GCC may propose modifications to the on-board system that the latter may accept, decline or adjust, the opposite possibly not being authorized. Likewise, the on-board system may propose modifications to the ground system GCC, for example air traffic control (ATC), which may accept, decline or adjust them, the opposite being possible in this particular case.

More specifically, if a modification to the flight plan or to another of the displayed objects is made on one of the systems implementing the invention, this modification is sent to the other systems. The operator of each of the on-board systems (or ground in the case of ATC) may then accept or decline the modification. If some or all of the objects are accepted, they are modified in the receiving system, and a response message detailing the modification as performed by the receiving system is returned. The sending system may then check whether the modification made by the system is actually identical to the sent modification. If so, the modification is accepted in the status of the object under consideration.

The invention thus makes it possible to synchronize the depiction of the flight plan and of the surrounding objects between the system 1000 and the system 1200. Specifically, modifications made on one side are propagated to the other. This makes it possible to create a collaborative workspace in which the various operators, for example a pilot and an air operations controller, are able to interact in real time. Reference is then made to a deterministic dynamic flight plan context, since the flight plan and its context are shared dynamically between all of the systems collaborating on the flight plan. It is also deterministic in the sense that it cannot be interpreted.

In addition, when a message is sent from one system to another with a modification, a response message is returned with a status indicating either the rejection of the modification or, when the modification is accepted, returning of the same modification, or subsequent modifications. The sender of a modification may thus check whether the modification has been applied identically, or has involved subsequent modifications.

All of these features make it possible to make communications between the various operators more reliable and secure, in particular between the ground and on board aircraft.

This also allows real-time interaction between the various operators.

Communication latency is also reduced. Specifically, the time to validate a flight plan both on the ground and on board is considerably reduced in comparison with existing procedures: pilots and air traffic controllers for example do not need to communicate via voice messages.

The invention also makes it possible to guarantee better air safety, since the various operators have access to up-to-date information at all times and in real time.

Although the invention is generally presented in the context of communication between an aircraft and an operations control center, it is also applicable to many other cases, such as communication between an aircraft and multiple other operations control centers or even control towers, or communication between multiple drone control centers.

In one set of embodiments of the invention, the first system 1000 comprises at least one flight management system 1050. If the first system is an on-board system of an aircraft, the flight management system may typically be an FMS. If the first system 1000 is a system for remotely controlling a drone, the flight management system 1050 may be a system for computing a trajectory of the drone based on the flight plan, on the ground or on board. In any case, the flight management system 1050 is able to check the ability of the aircraft to follow a flight plan, in particular in view of its aerodynamic performance, to compute a trajectory from the flight plan, and to control the aircraft on the trajectory, for example by sending instructions to an autopilot or AFCS.

The at least one computing unit 1040 may interact bidirectionally with the flight management system 1050 in order to send or receive modifications to the flight plan.

In one set of embodiments of the invention, a modification to the flight plan may be initiated by the flight management system 1050. It is then transmitted to the at least one computing unit 1040, and integrated into the graphical interface. In one set of embodiments of the invention, a flight plan modification initiated by the avionics does not need to be validated by the operator of the system 1000: it may be transmitted directly to the system 1100.

Conversely, modifications to the flight plan in the collaborative interface may be sent to the avionics as soon as they are validated both on the system 1000 and on the system 1100, or manually upon request from the operator of the system 1000.

This makes it possible to ensure that the collaborative flight plan displayed on the collaborative interface is actually consistent with the flight plan used by the avionics, and to dynamically modify the flight plan from each of the systems implementing the invention. This also makes it possible to take into account the modifications to the flight plan that stem from the avionics.

Figure 2:
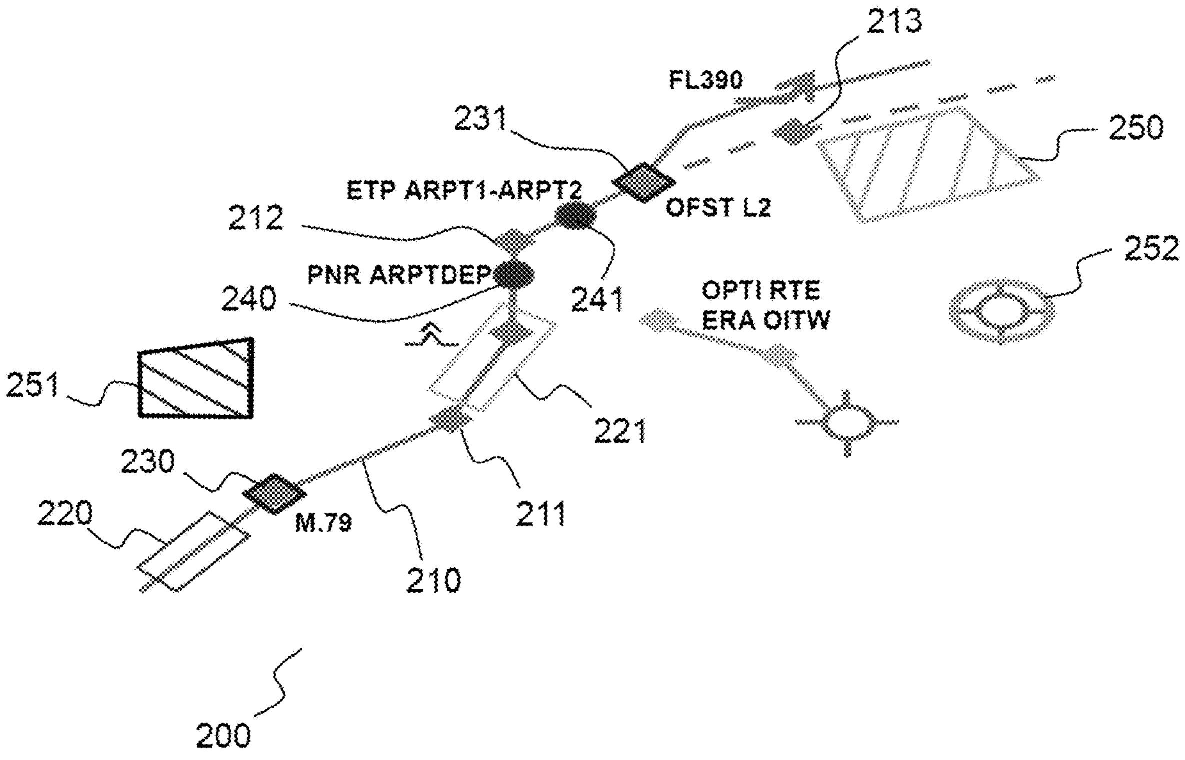
FIG. 2 shows an example of a graphical interface according to one set of embodiments of the invention.

FIG. 2 shows an example of a graphical interface in one embodiment of the invention.

The graphical interface 200 may be used both by the first system 1000 and by the second system 1100. It depicts the set of objects in the workspace. In the example of FIG. 2, the set of objects in the environment of the flight plan 210, defined notably by the waypoints 211, 212, and 213, comprises:

- defined areas along the flight plan:
  - a GPS service interruption prediction area 220;
  - a turbulence prediction area 221;
- modifications to the flight plan, or information defined on the flight plan:
  - a speed change 230 (change to Mach 79);
  - creation or change of a trajectory offset (lateral offset) at a point 231, a climb to a new FL at a point 213;
  - a point of no return to the departure aerodrome 240;
  - an equidistant or equi-time point between the departure and arrival aerodromes 241;
- information defined outside the flight plan:
  - a danger zone location 250;
  - a no fly zone location 251;
  - highlighting of an alternate aerodrome 252.
  - An inactive flight plan section not belonging to the active flight plan In general, when the last modifications are validated by each of the systems, the same graphical interface is displayed on each of the systems, and allows each of the operators to have the same view of the modified flight plan and its environment for this mission. Specifically, ground operators are able to see multiple missions but, for a given mission, the flight plan and the interface are the same as those of the flight in question. This thus allows a more fluid interaction between the various operators, notably between the pilots and the ground operators.

The graphical interface 200 may be executed in the form of a specific module by the computing units 1040, 1140 may execute, in connection with the display devices 1010, 1110, and the input interfaces 1020, 1120, respectively.

Many actions may be performed on the graphical interface. For example, operators are able to zoom in and out, shift view, but also interact, notably by modifying the flight plan, adding objects or validating objects added by other operators.

The graphical interface 200 makes it possible to define features of objects and to place them on the map. It also makes it possible to visualize their insertion and to send them to other systems using the shared interface.

Each of the objects may be defined using a library of attributes, comprising, inter alia: a type, a label, a text and a function. The shape and the position of an object may be defined in multiple ways. For example, they may be defined graphically on the mission interface, in the form of a succession of points, or by entering parameters in text form.

Figure 3:
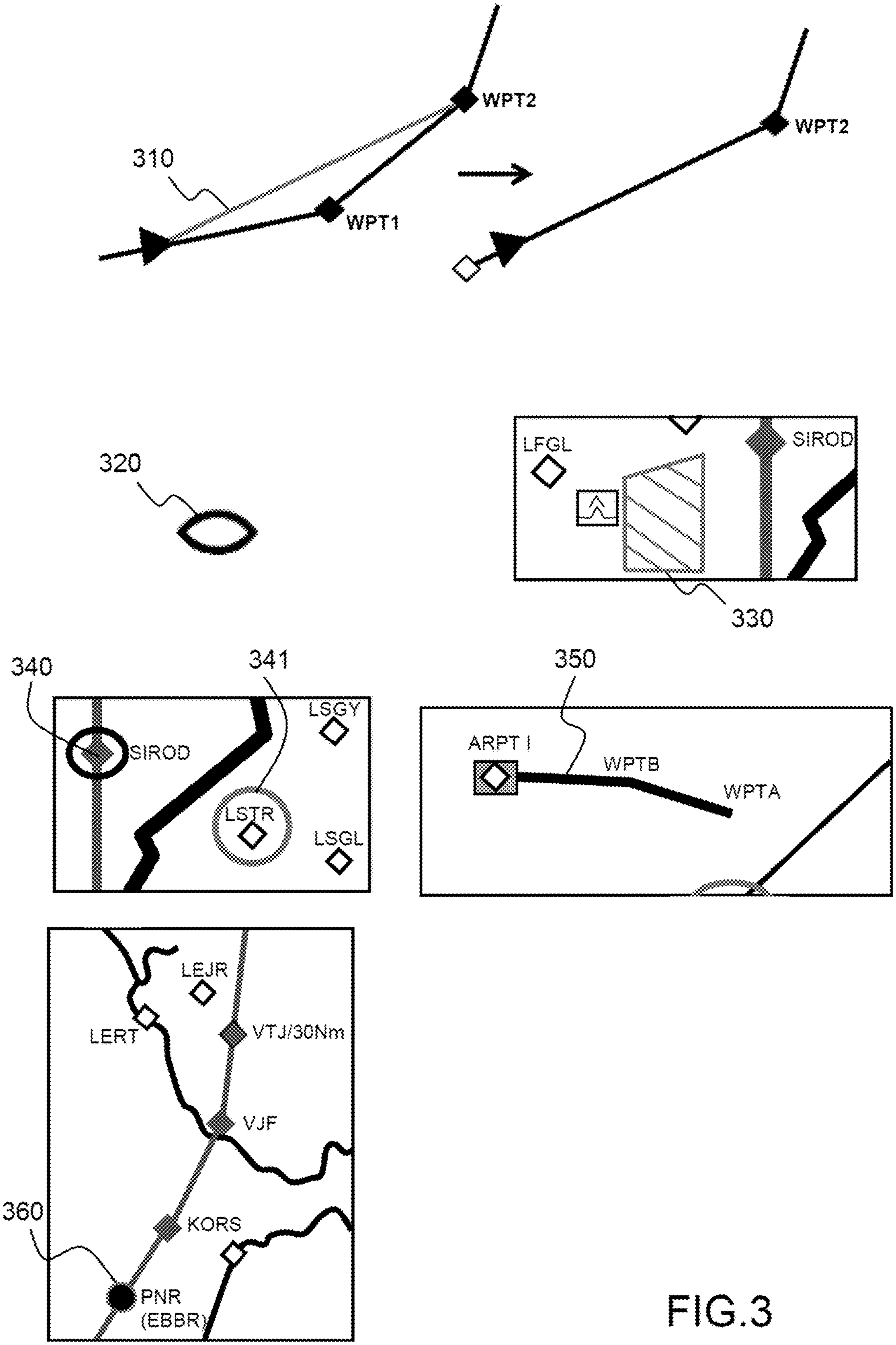
FIG. 3 shows several examples of objects of a graphical interface in one set of embodiments of the invention.

FIG. 3 shows several examples of objects of a graphical interface in one set of embodiments of the invention.

The objects exchanged via the messages may, according to various modes of implementation of the invention, belong to the various categories.

Regardless of the objects, flight plan revisions will be considered. This may involve the addition or deletion of one or more points, procedures, or FPL sections. These revisions update the flight plan dynamically. For example, the revision 310 consists of a flight plan revision instruction of the type "DirectTo", instructing the aircraft to fly directly to the waypoint WPT2, bypassing the waypoint WPT1. If this modification is accepted, the initial flight plan 311, comprising the waypoint WPT1 and then the waypoint WPT2, becomes the flight plan 312, in which the aircraft flies directly to the waypoint WPT2, starting from a geographical starting point (latitude/longitude) T-P, which is also shared between the ground and on board. These revisions may stem from navigation applications or the flight management system 1040 and may comprise:

- usual navigation functions, such as the functions Direct To, offset (lateral offset), addition, deletion of one or more points, holding pattern, one or more procedures, etc.;
- updates to parts of flight plans.

A flight plan revision may be initiated by an operator on one of the interfaces 1020, 1120, or by the flight management system 1040.

In one set of embodiments, the objects may also belong to one of the following types:

- an area of text;
- an information symbol;
- a closed surface;
- a pseudo-point defined as another type of point created by the operator or the system that may be fixed or moving along the flight plan, different from a fixed waypoint from a database;
- a graphical element;
- a flight plan section not linked to the reference flight plan.

More generally, any graphical object able to be inserted into a navigation interface may be used by the invention, whether it is of a purely informative or graphical nature (example: an area of text), or whether it contains information able to interact with the reference flight plan (example: a closed surface representing an area of hazardous weather). A flight plan revision is a function able to be applied directly in the flight plan management function in the sense of the prior art of navigation functions of a flight management system FMS, for example the deletion of a point, the activation of a Direct To, the insertion of a vertical climb level, etc.

These objects are defined by a set of attributes that may notably comprise:

- a type: defines the type of graphical objects: point, surface, etc.;
- a position: this may be defined in various ways, for example by geographical coordinates, or a relative position on the flight plan;
- a label;
- a text;
- where applicable, a function defining an interaction with the flight plan (for example, an area passed through by the flight plan generates a function such as an offset (lateral offset)).

In one set of embodiments of the invention, a system may be used to visualize multiple different flight plans of multiple aircraft. For example, an air traffic control system may alternately display multiple different flight plans corresponding to various aircraft with which the air traffic controller is able to communicate.

The objects to be displayed may be more or less relevant depending on the flight plan under consideration: some objects may be defined generally at a location regardless of the flight plan under consideration. For example, a closed surface indicating a storm constitutes a relevant object regardless of the flight plan or the aircraft under consideration. Reference is then made to a universal object that is displayed regardless of the flight plan under consideration on the GCC side.

On the contrary, some objects are relevant only for a given flight plan. For example, a pseudo-point on a flight plan should be displayed only for a flight plan under consideration, and not for other aircraft. Reference is then made to a specific object, associated with a given dynamic flight plan.

In one set of embodiments of the invention, the universal objects are displayed regardless of the flight plan under study, and the specific objects are displayed only when the flight plan associated therewith is displayed. This allows for example an operator of the operations control center to change a flight plan in order to collaborate with various aircraft, all while having a set of universal objects that are visible at all times.

An "area of text" object may place text that provides an indication to other operators. For example, text "NO ENTRY FL 200 FL 400" indicates there is a no fly zone between FLs 200 and 400.

Symbol objects may be defined from a symbol library common to the various systems, each symbol being defined by an identifier in the library. For example, the symbol 320 represents mountain waves and may be inserted, by one of the operators, at any location in the working area that may be associated with a geographical area. Using a common base of symbols makes it possible to interactively add symbols that are able to be understood immediately by all operators, thereby allowing even more fluid interaction between the various operators.

Closed areas may be defined by a set of geographical positions defining a geometric shape, delimited by a contour, a fill level corresponding to a criterion associated with the object and a label. For example, the hatched space in the area 330 defines a weather hazard.

A "highlight" object defines a geometric figure arranged around an object of the interface. This figure may notably be defined by a shape, a color and a thickness, in order to highlight an element depicted on the interface. For example, the objects 340 and 341 highlight the waypoints "SIROD" and an airport "LSTR", respectively, in order to signify that the airport LSTR is a preferred diversion airport.

A "flight plan section" object represents a set of points and/or elements of a flight plan that are independent of the dynamic flight plan. For example, the flight plan section 350 defines a flight plan section between the waypoints WPTA, WPTB, and the airport ARPTI.

A "pseudo-point" object represents a pseudo-point of the flight plan, that is to say a point on the flight plan that does not involve any modification thereto or revision thereof. For example, it may be an informative point. For example, the pseudo-point 360, associated with the label "PNR" (Point of No Return), indicates a point of the flight plan from which the aircraft is no longer able to turn back to reach the departure aerodrome with the minimum fuel on board.

Figure 4:
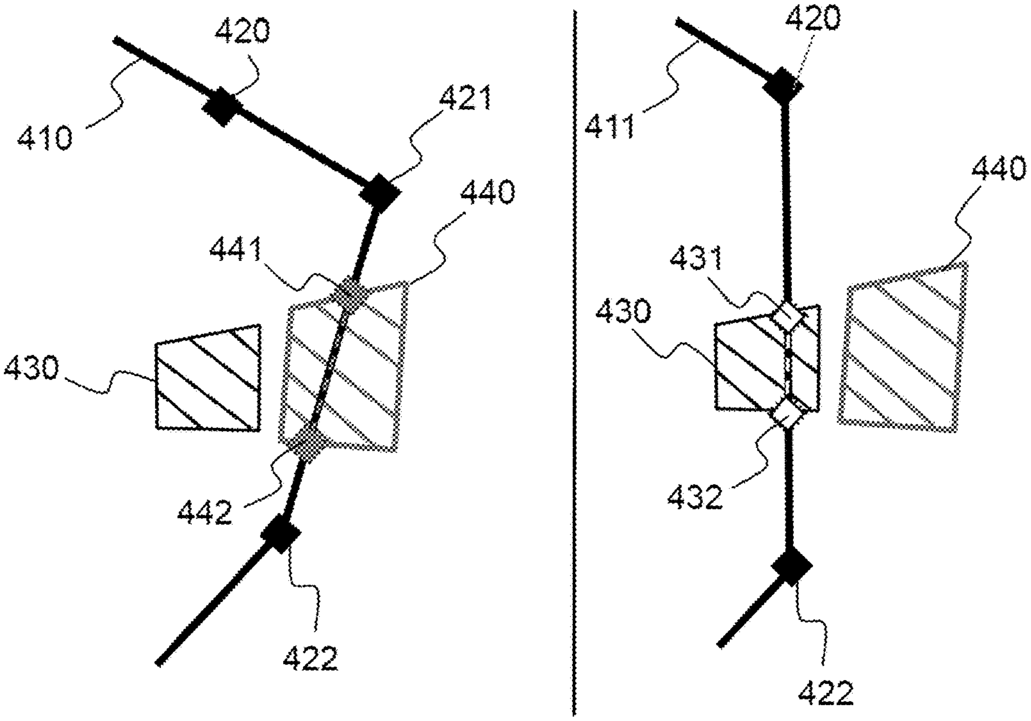
FIG. 4 shows a first example of creating derived objects, before and after revision of a flight plan, in one set of embodiments of the invention.

FIG. 4 shows a first example of creating derived objects, before and after revision of a flight plan, in one set of embodiments of the invention.

In one set of embodiments of the invention, the interaction of certain objects with the dynamic flight plan leads to the creation of other objects, which may be called derived objects.

Thus, upon receipt of a modification to the set of objects, the at least one computing unit is configured so as to:

- check whether said modification involves an interaction between the flight plan and another object in the set;
- if the modification involves an interaction, create an object symbolizing the interaction. This new object is a derived object.

Conversely, if the modification to the objects involves the deletion of an interaction with the flight plan, the corresponding derived objects may be deleted. To this end, each system according to the invention may continuously update a list of original objects and of derived objects, and iteratively add or delete derived objects when the modifications to the original objects involve the creation or the deletion of an interaction with the flight plan.

This makes it possible to automatically identify points of interest linked to the interaction between the flight plan and its environment.

This may be achieved when an operator modifies the objects. The derived objects are then created locally, and then sent to the other systems at the same time as the initial modification.

In one set of embodiments of the invention, when original objects are created on an on-board system, or more generally on a system comprising an interface with the avionics, any modifications to the derived objects are computed, and then all of the modifications (on the original objects and on the derived objects) are sent to the ground systems.

This may also be performed upon receipt of a message indicating a modification made on a sending system. In this case, the modifications to the derived objects are made, and a return message is sent to the sending system, with all of the changes applied to the original objects and the derived objects.

In one set of embodiments of the invention, when original objects are created on a ground system, or more generally on a non-avionic system, objects derived from flight plans not displayed in the ground system are not created; only the original objects and the derived objects (resulting from the interaction with one or more flight plans) are created. The original objects are then sent to the on-board system, which will take them into account to generate the derived objects.

Figure 6:
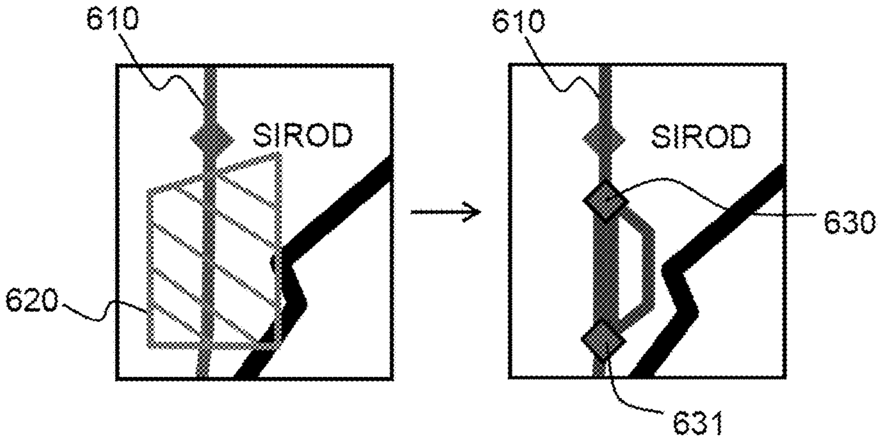
FIG. 6 shows an example of creating a derived object based on a flight plan after insertion of an original closed-surface object, in one set of embodiments of the invention.

In one set of embodiments of the invention, an interaction between the flight plan and the other objects consists in placing or deleting pseudo-points when the flight plan enters or leaves a closed surface. The addition or deletion of pseudo-points may occur either when a closed surface is added or deleted or when the flight plan is modified. The pseudo-points may be associated with flight plan functions depending on the meaning of the closed surface. FIG. 6 provides one example of such an association.

This makes it possible to identify the aircraft entering and leaving particular areas. For example, if the closed area represents an area of turbulence, the aircraft entering and leaving the turbulence may be depicted automatically.

Other types of derived objects may be used, according to various embodiments of the invention. For example, the interaction between the flight plan and a surface or a volume may generate the production and modification of objects, such as 4D volumes, which vary over time. For example, these volumes may represent the aircraft entering a danger zone.

In the example of FIG. 4, the flight plan 410 initially comprises the points 420, 421 and 422. Two closed surfaces 430, 440 are defined in the environment of the flight plan. Initially, the flight plan passes through the surface 440, entering it at the pseudo-point 441, and leaving it at the pseudo-point 442.

The flight plan is then modified into a flight plan 411 by deleting the waypoint 421: the aircraft then goes directly from the point 420 to the point 422. It then no longer passes through the area 440, but rather through the area 430: the pseudo-points 441 and 442 are deleted, but the pseudo-points 431 and 432 are added, respectively at where the aircraft enters and leaves the closed surface 430.

Figure 5:
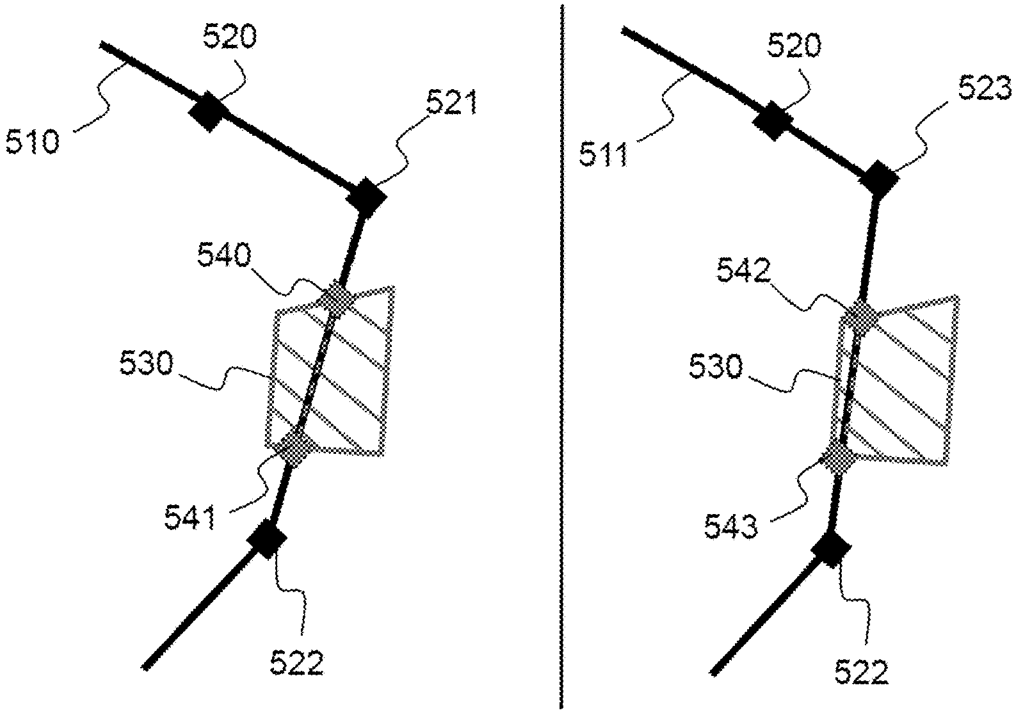
FIG. 5 shows a second example of creating derived objects, before and after revision of a flight plan, in one set of embodiments of the invention.

FIG. 5 shows a second example of creating derived objects, before and after revision of a flight plan, in one set of embodiments of the invention.

In this example, the flight plan 510 consists of the waypoints 520, 521 and 522, and passes through the closed area 530. Some derived objects are thus present: the pseudo-points 540 and 541, respectively representing the entrance and the exit of the closed surface 530.

Next, the flight plan 510 is modified into a flight plan 511: the waypoint 521 is replaced with the waypoint 523. The flight plan then still passes through the surface 530, but the entry and exit points are modified. As a result, the pseudo-points 540 and 541 are deleted and replaced by the pseudo-points 542 and 543, respectively located at the new entry into the area 530 and at the new exit from the area.

FIG. 6 shows an example of creating a derived object based on a flight plan after insertion of an original closed-surface object, in one set of embodiments of the invention.

In this example, a closed surface 620 is added on the ground side, delimiting a navigation area with an offset (lateral offset) with a distance of 5 nautical miles to the right of the flight plan 600. This surface is passed through by the flight plan. After addition on the ground side, the surface is sent to the on-board system.

The on-board system then checks whether the interaction between the surface and the flight plan leads to the creation of derived objects. In this example, the answer is positive, and two waypoints 630 and 631 are added to the flight plan, respectively at where the flight plan enters the surface and at where the flight plan leaves the surface. These waypoints are respectively associated with a flight start and end function with an offset (lateral offset) of 5 nautical miles.

This example is given only by way of non-limiting example and, in general, the interaction of a surface with a flight plan may lead to the creation of waypoints on the flight plan, associated with a function depending on the meaning of the closed surface.

Figure 7A:
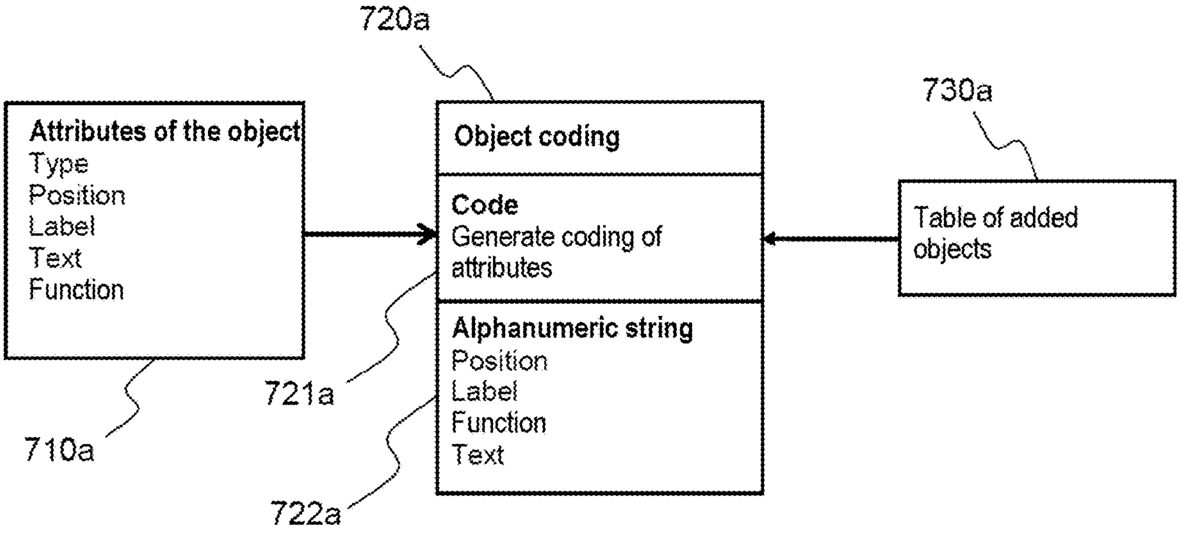
FIG. 7*a* shows an example of coding an object, according to one set of embodiments of the invention.
Figure 7B:
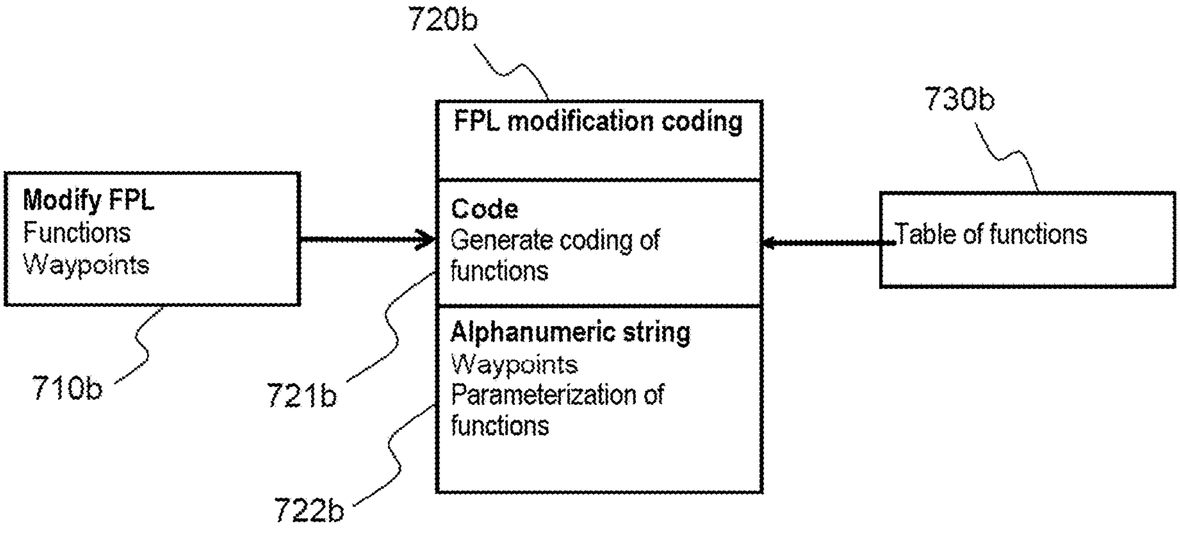
FIG. 7*b* shows an example of coding a flight plan revision, according to one set of embodiments of the invention.

FIGS. 7*a* and 7*b* respectively show an example of coding an object and an example of coding a flight plan revision, according to one set of embodiments of the invention.

In order to be able to communicate the objects and modifications to the objects deterministically, the computing units 1040, 1140 are configured so as to code the added or modified objects before sending a message, and to symmetrically decode the object upon receipt of a message with a view to including it. The coding of the additions or modifications may take various forms. For example, a label may be assigned to the added and/or modified objects. A timestamp may also be inserted, corresponding to the last modification of the object.

In the example of FIG. 7*a*, an object 710*a* is defined by one or more attributes, which may for example be chosen from among the following attributes: type, position, label, text, function. The object 710*a* may for example be a context object or environment object.

In one set of embodiments, the coding of the object is based on a list of predefined codes defining the various types of objects and attributes, and consists in representing the object as follows:

- first of all, a predefined code representing the type of objects, and then, for each attribute present for the object, a predefined code representing each type of attribute. These sets of codes represent a code section 721*a*. This section may also comprise an object identifier chosen from among identifiers of an object from among a table 730*a* of objects already added to the interface. This makes it possible to detect that the coding defines a modification to an object that is already present, and not the addition of a new object;
- next, an alphanumeric character string 722*a* defines the associated value for each attribute.

For example, an object may be represented as below:

- each type of object is coded in alphanumeric form. For example, an "area" object will be represented by the attribute "Z", and a "Mountain wave" object will be represented by the attribute "M";
- each type of object is associated with a set of predefined attributes. For example, the attributes of an area Z will be a series of positions defined in the form of latitudes and longitudes;
- an alphanumeric character string is inserted for each of the attributes, for example a character string representing the successive latitudes and longitudes for an area object.

Upon receipt of a message, the reverse operation may be performed: first of all, the code section 721*a* is decoded, making it possible to determine what type of object is decoded and what attributes are present. Next, the alphanumeric string 722*a* is read in order to provide a value for each of the attributes.

This convention makes it possible to exchange messages defining the objects deterministically: object creations and modifications may be coded and decoded transparently by the various systems. This coding of the objects therefore allows interoperability in the management of the objects between the various systems. However, it is given only by way of non-limiting example, and any convention for coding and decoding the objects may be used according to various embodiments of the invention.

In one set of embodiments of the invention, each type of attribute is associated with an alphanumeric character string of predefined length. For example, the geographical coordinates of the objects may be defined by a character string of a given length representing their latitude and their longitude.

This makes it possible, once the attribute types used by the object have been defined in the code section 721*a*, to store, in the coding of the object, only the alphanumeric characters needed for the attributes actually used by the object. This therefore makes it possible to code the objects in a compact manner, and therefore to save on bandwidth during message exchanges.

The coding of the objects, according to various embodiments of the invention, may be combined with the standardized coding of the waypoints. For example, the standardized code of a waypoint may be inserted into the code of the object exchanged between the interfaces according to the invention.

In any case, including alphanumeric characters only for modified attributes allows compact coding and a saving on bandwidth for communication between remote systems.

The same principle is applied to the flight plan modifications, which may be coded and decoded through coding shared between the various systems using the invention.

One example of coding flight plan modifications is shown in FIG. 7*b*. In this case too, this is merely a non-limiting example, and any type of coding allowing deterministic coding and decoding of flight plan modifications may be used according to various embodiments of the invention.

A flight plan modification 710*b* may be defined by one or more waypoints, and one or more flight plan functions. The functions may be for example trajectories resulting from specific functions of the on-board system, such as the offset trajectory (lateral offset).

Coding 720*b* the flight plan modifications may comprise:

- a code section 721*b* comprising:
  - a predefined code defining that a flight plan modification is involved;
  - for each of the functions of the modification, a predefined code defining the type of function. When a function is modified, its identifier may be indicated, among a table 730*b* of the functions of the flight plan;
- an alphanumeric string 722*b* defining the coordinates of each waypoint, and the parameters of the added functions.

One example of coding a flight plan modification: "Direct To" function going to the waypoint ABCDE. The "Direct To" is coded "D"; the string defining the functional coding is D ABCDE.

In the same way as the objects, this convention makes it possible to exchange the modifications to the flight plan transparently between the various systems using a shared interface.

In addition, the alphanumeric string contains only the parameter values corresponding to the coding of the waypoints and functions actually present in the modification. This convention therefore allows compact coding of the modifications to the flight plan, and savings on bandwidth.

Moreover, the coding of objects and flight plan modifications allows effective validation of the integrity of the modifications.

Specifically, as explained above, upon receipt of a modification to the set of objects, the receiving system applies the modification, presents it to an operator and, if said operator approves the modification, recodes the modification, as applied to the receiving system, in order to return it to the sending system. It is then sufficient for the sending system to compare the codes of the sent modification and of the received modification in order to check the integrity of the modification on the receiver side: if the codes are identical, the modification will indeed have been applied identically on the receiver side.

This code mechanism therefore provides a simple and effective method for validating the integrity of modifications with all of the systems involved, and for ensuring that the modifications are correctly synchronized by the various systems.

Figure 8:
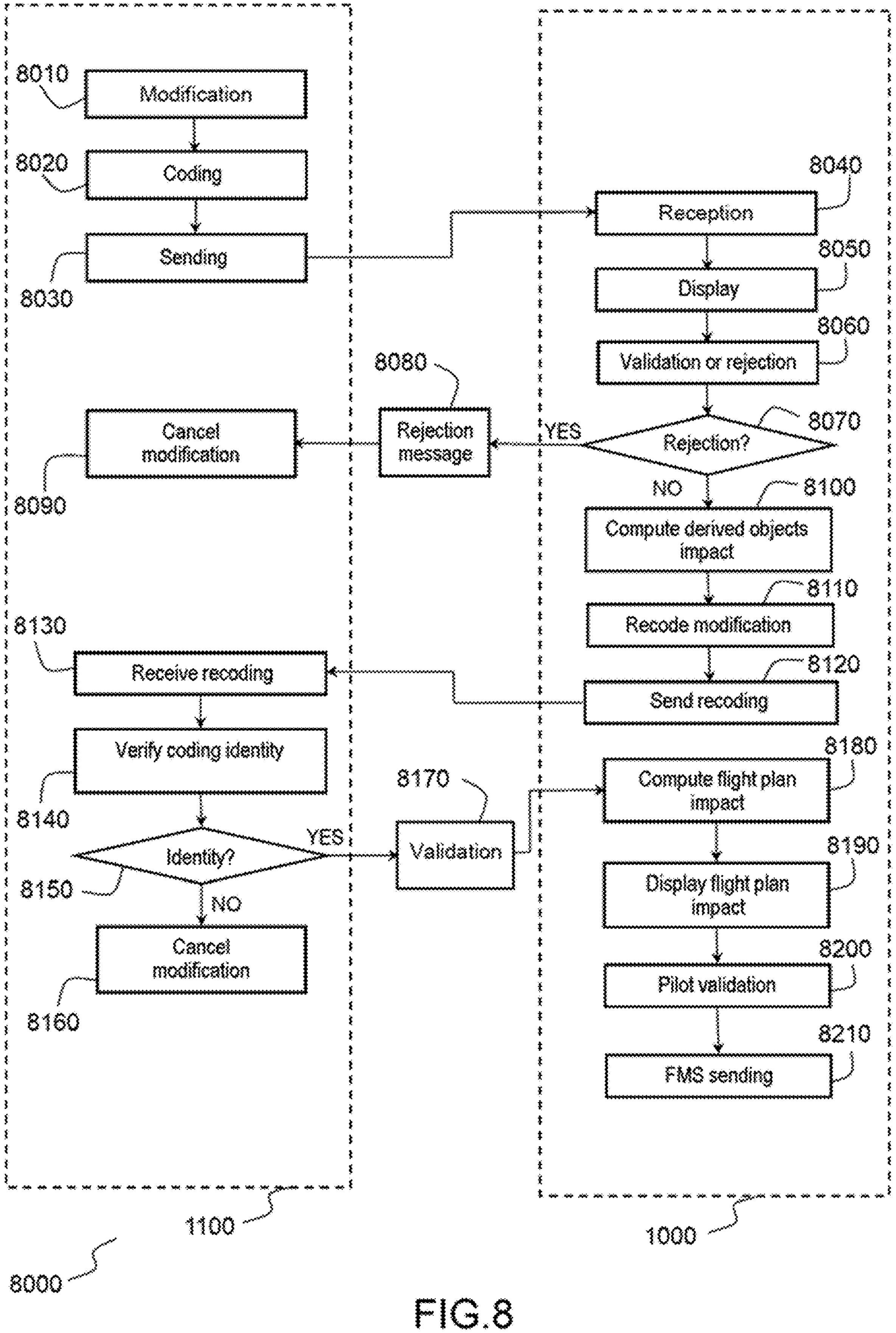
FIG. 8 shows a method for applying a modification to a ground system, and for validating the modification on an on-board system, in one set of embodiments of the invention.

FIG. 8 shows a method for applying a modification to a ground system, and for validating the modification on an on-board system, in one set of embodiments of the invention.

In this example, a modification to a set of objects of an interface is made by an air traffic controller in the system 1100, and sent to the system 1000. However, this method is given only by way of non-limiting example: some steps are used only for some embodiments of the invention.

In addition, the implementation by the systems 1000 and 1100 is given only by way of example. More generally, this method may be implemented between a system having only access to the shared interface, and a system having access to a flight management system. Likewise, the pilot and the air traffic controller may be replaced by other operators, such as a remote drone pilot.

Figure 9:
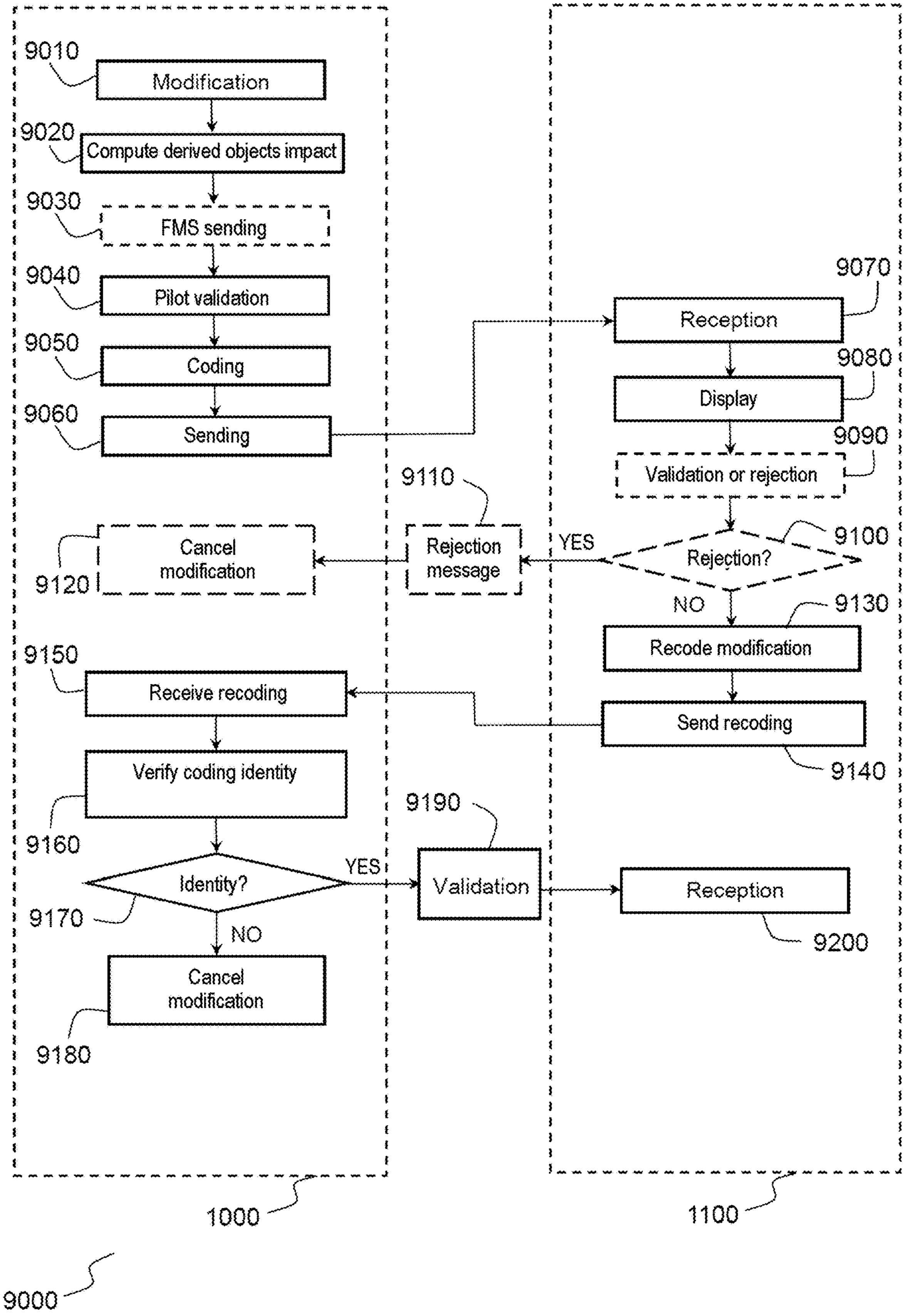
FIG. 9 shows a method for applying a modification to an on-board system, and for validating the modification on a ground system, in one set of embodiments of the invention.

FIGS. 8 and 9 respectively show examples of creating objects on the ground and on board. Specifically, although the interaction on the ground and on board exhibits a large number of symmetrical features, in one set of embodiments of the invention, some differences are present. For example, the on-board modifications may be considered to take priority over the ground modifications. Some on-board modifications thus do not require validation from the ground. Likewise, the interaction with the avionics takes place on board. These principles may also more generally be applicable to an interaction between a system having access only to the interface and a system having access to a flight management system.

Finally, FIGS. 8 and 9 are presented, for the sake of simplicity, for the interaction between two systems. However, this is a non-limiting embodiment: the invention is applicable to interactions between more than two systems on the same shared interface: it is enough in this case to send the modifications to all of the systems, and to extend the concept of validation to the feedback from all of the systems, a modification being considered to be definitively adopted only when it is validated by all of the systems.

The steps of the method 8000 may notably be executed by the computing units 1040, 1140.

In a first step 8010, the air traffic controller makes a modification to the set of objects of the interface, as depicted by the system 1100. This modification may for example consist in creating an object, modifying or deleting an existing object, or modifying the flight plan. The modification is notably made by the inputs 1120, in connection with the display 1110.

In the example of the interface 200, the modification may for example consist in modifying the flight plan 210, deleting or modifying one of the original objects of the interface (for example one of the objects 220, 221, 240, 241, 250, 251), or adding a new object.

The method may comprise an intermediate step of displaying the modification in the system 1100, of validating the modification as displayed by the air traffic controller, and of ordering sending.

Next, in a step 8020, the modification is coded, for example in line with the principles discussed with reference to FIGS. 7*a* and 7*b*.

In step 8030, the modification is sent to the system 1000.

In step 8040, the modification is received by the system 1000 and decoded.

In step 8050, the modification is displayed by the system 1000 in order to be seen by the pilot.

The pilot may then validate or reject the modification, notably via the at least one input interface 1020. In step 8060, the feedback (validation or rejection from the pilot) is received.

In step 8070, the feedback type is tested.

In the event of rejection, a rejection message 8080 is sent from the system 1000 to the system 1100. When this message is received by the system 1100, the modification is canceled in step 8090 in the system 1100, which therefore returns to the previous state.

Otherwise, if the pilot has validated the modification, in step 8100, the impact of the modification on the derived objects is checked, for example on the model explained with reference to FIGS. 4 and 5: if, following the modification, derived objects have to be created, modified or deleted, these modifications are evaluated and displayed in step 8100.

In step 8110, the modification, as applied in the system 1000, is recoded. This recoding step 8110 therefore comprises coding the received modification, as actually applied on the system 1000, and where applicable, coding the modifications to the derived objects.

In other embodiments of the invention, the modifications to the derived objects are computed, coded and sent later.

In step 8120, the recoding of the modification is sent to the system 1100.

In step 8130, the recoding is received by the system 1100.

In step 8140, the system 1100 checks that the recoding (excluding modifications to the derived objects) is identical to the initial coding, performed in step 8020.

If the codings are not identical 8150, this means that an error has occurred, and that the modification has not been adopted identically by the system 100.

The modification is then canceled in step 8160. This makes it possible to ensure that the modifications are actually applied identically on the various systems, and therefore to make the interaction between the systems more reliable. This step 8160 may notably comprise a notification from the air traffic controller that the modification has been canceled, and the cancelation of the display. It may also comprise sending a message to the system 1000 so that said system also cancels the modification on its side.

The air traffic controller may then, if he wishes, make a modification again, and the method 8000 is executed again, with a new modification.

If the codings are indeed identical, a validation message 8170 is sent to the system 1000. The systems are correctly synchronized, and the modification then becomes definitive.

In step 8180, the system 1000 checks whether the modifications have an impact on the flight plan. This is for example the case if the sent modification is a modification to the collaborative flight plan, or if certain objects impact the flight plan, as in the example of FIG. 6.

If there is an impact on the flight plan, this is displayed to the pilot in step 8190.

In step 8200, validation from the pilot is received. If the pilot rejects the modifications to the flight plan involved in the modification, said modification is canceled. A message is sent to the system 1100 to inform the air traffic controller and to cancel the modification on the system 1100 side.

After validation from the pilot, the modification to the flight plan is sent, in step 8210, to the flight management system 1050.

If the flight management system rejects the modification, for example if it is not compatible with the aerodynamic performance of the aircraft, the modification is canceled, both in the system 1000 and in the system 1100.

If the modification to the flight plan is accepted by the flight management system 1050, but involves new modifications, these are received via the collaborative interface, as explained for example in FIG. 9.

FIG. 9 shows a method for applying a modification to an on-board system, and for validating the modification on a ground system, in one set of embodiments of the invention.

In this example, a modification to a set of objects of an interface is made in the system 1000, either through an action of the pilot or through receipt of a flight plan modification by the flight management system 1050, and sent to the system 1000. However, this method is given only by way of non-limiting example: some steps are only used for some embodiments of the invention.

In addition, the implementation by the systems 1000 and 1100 is given only by way of example. More generally, this method may be implemented between a system having only access to the shared interface, and a system having access to a flight management system. Likewise, the pilot and the air traffic controller may be replaced by other operators, such as a remote drone pilot.

The steps of the method 9000 may notably be executed by the computing units 1040, 1140.

In a first step 9010, a modification to the set of objects of the interface, as depicted by the system 1000, is received at input. This modification may for example consist in creating an object, modifying or deleting an existing object, or modifying the flight plan.

The modification may notably be initiated by:

- the pilot, who enters them via the inputs 1020, in connection with the display 1010;
- the flight management system 1050, which initiates a modification to the flight plan. If this modification is validated by the pilot, the modification is received at input of the method 9000.

In the example of the interface 200, the modification may for example consist in modifying the flight plan 210, deleting or modifying one of the original objects of the interface (for example one of the objects 220, 221, 240, 241, 250, 251), or adding a new object.

If, following the modification, derived objects have to be created, modified or deleted, these modifications are evaluated and displayed in step 9020. The pilot may then, in one set of embodiments of the invention, accept or decline the modifications. If he declines, the modification is canceled.

If the modification does not stem from the flight management system 1050, but involves a modification thereto, and if the pilot accepts the modifications, the flight plan modification is sent to the flight management system 1050.

If the flight management system rejects the modification, for example if it is not compatible with the aerodynamic performance of the aircraft, the modification is canceled.

If the modification to the flight plan is accepted by the flight management system 1050, but involves new modifications, these are received via the collaborative interface, as additional modifications, and displayed to the pilot, who may accept them or decline them.

In step 9040, validation from the pilot is received for all of the modifications.

Next, in a step 9050, the modification or the modifications (initial modification, modifications to the derived objects, modifications to the flight plan following the sending of the FMS) are coded, for example in line with the principles discussed with reference to FIGS. 7*a* and 7*b*.

In step 9060, the set of modifications is sent to the system 1100.

In step 9070, the set of modifications is received by the system 1100.

In step 9080, the modifications are displayed by the system 1100 in order to be seen by the air traffic controller.

According to various embodiments of the invention, the air traffic controller has to validate or not validate the modifications. For example, the air traffic controller may have to validate all of the modifications. On the contrary, the modifications sent from on board may all be applied automatically on the ground, without validation from the air traffic controller. Finally, only certain types of modification (for example modifications to the flight plan) may be subject to validation by the air traffic controller.

If the modification is subject to validation from the air traffic controller, said air traffic controller may validate or reject the modification, notably via the inputs 1120. In step 9090, the feedback (validation or rejection from the air traffic controller) is received. The subsequent steps 9100, 9110, 9120 are also activated only if the modification is subject to validation from the air traffic controller.

In step 9100, the feedback type is tested.

In the event of rejection, a rejection message 9110 is sent from the system 1100 to the system 1000. When this message is received by the system 1000, the modifications are canceled in step 9120 in the system 1000, which therefore returns to the previous state.

Otherwise, if the air traffic controller validates the modifications, or if these are not subject to validation, in step 9130, the modifications as applied in the system 1100 are recoded. This recoding step 9130 therefore comprises coding the received modifications as actually applied in the system 1100.

In other embodiments of the invention, the modifications to the derived objects are computed, coded and sent later.

In step 9140, the recoding of the modification is sent to the system 1000.

In step 9150, the recoding is received by the system 1000.

In step 9160, the system 1000 checks that the recoding is identical to the initial coding, performed in step 9050.

If the codings are not identical 9170, this means that an error has occurred, and that the modification has not been adopted identically by the system 100.

The modifications are then canceled in step 9180. This makes it possible to ensure that the modifications are actually applied identically on the various systems, and therefore to make the interaction between the systems more reliable. This step 9180 may notably comprise a notification from the pilot that the modifications have been canceled, and the cancelation of the display. It may also comprise sending a message to the system 1100 so that said system also cancels the modification on its side.

The pilot may then, if he wishes, make a modification again, and the method 9000 is executed again, with a new modification.

As an alternative, the coding of the modifications may be sent to the system 1100 again, without canceling the modifications.

If the codings are indeed identical, a validation message 9190 is sent to the system 1100. In step 9200, the message 9190 is received by the system 1100. The systems are correctly synchronized, and the modification becomes definitive.

Like the method 8000, the method 9000 demonstrates the ability of the invention to allow multiple systems to work collaboratively on flight plans, all while ensuring that the modifications made on both sides are correctly synchronized between the various systems.

For the sake of simplicity, the examples that are provided relate to exchanges between two systems. More generally, the invention is applicable to exchanges between more than two systems. According to one set of embodiments of the invention, a system may for example "centralize" operations. In this case, the modifications to the objects of the collaborative interface are propagated from the central system to the others, and the examples developed above may be generalized. For example, if a modification is made on the central system, it will be propagated to the other systems, and may be canceled if at least one of the other systems rejects the modification. If a modification is received by the central system and validated thereby, a message comprising the modification may be sent to the other systems. This makes it possible to deploy the collaborative interface on more than two systems.

The examples above demonstrate the ability of the invention to implement a collaborative working interface and flight plan between various systems. These examples are however given only by way of example and in no way limit the scope of the invention, which is defined in the claims below.

The invention claimed is:

1. A first system comprising:

at least one display device configured so as to display a set of objects comprising a reference flight plan of an aircraft and at least one environment object or context object;

at least one input interface;

at least one communication port configured so as to communicate with at least one second system;

at least one computing unit configured, upon receipt, via the at least one communication port, of a message indicating a first description of a modification to the set of objects, so as to:

generate a display of the modification; and send, via the at least one communication port, in response to a validation of the modification via the at least one input interface, a message to the at least one second system containing a second description of said modification.

2. The first system of claim 1, wherein the at least one computing unit is configured, upon receipt of the modification to the set of objects via the at least one input interface, so as to:

generate the display of the modification;

send, via the at least one communication port, a message to the at least one second system containing the first description of the modification;

receive, from the at least one second system, a message containing an indication of the rejection of the modification, or the second description of the modification;

if the message received from the at least one second system is a rejection message, or if the first and the second description are different, cancel the modification;

otherwise, validate the modification.

3. The system as claimed in claim 1, wherein the at least one environment object or context object comprises at least one object belonging to a type of objects chosen from a group comprising:

an area of text;

an information symbol;

a closed surface;

a pseudo-point on the reference flight plan;

a graphical element;

a flight plan section distinct from the reference flight plan.

4. The first system of claim 1, comprising at least one flight management system, and wherein the at least one computing unit is configured:

upon receipt of a modification to the reference flight plan by the at least one flight management system, so as to display the modification to the reference flight plan and send, via the at least one communication port, a message containing a description of the modified reference flight plan;

if the modification to the set of objects received via the at least one input interface is the modification to the reference flight plan, and is validated, send it to the at least one flight management system.

5. The system as claimed in claim 4, wherein the at least one computing unit is configured, upon receipt of the modification to the set of objects, so as to:

check whether the modification to the reference flight plan involves an interaction between the modified reference flight plan and another object in the set of objects;

if the modification to the reference flight plan involves an interaction, create a functional object symbolizing the interaction.

6. The system as claimed in claim 5, wherein the at least one computing unit is configured so as to:

check whether the modification to the reference flight plan involves the modified reference flight plan moving to an existing or new closed surface;

if the modification to the reference flight plan involves the modified reference flight plan moving to an existing or new closed surface, create a pseudo-point at where the flight plan enters the closed surface, and a pseudo-point at where the flight plan leaves the closed surface.

7. The system as claimed in claim 5, wherein the at least one computing unit is configured, upon receipt of the modification to the set of objects, so as to:

check whether the modification to the set of objects involves deleting the interaction between the modified reference flight plan and another object in the set of objects;

if the modification to the set of objects involves deleting the interaction, delete a functional object symbolizing the interaction.

8. The system as claimed in claim 1, wherein the at least one computing unit is configured, upon receipt of the modification to the set of objects comprising an addition or a modification of the at least one environment object or context object, so as to:

check whether the modification to the set of objects involves an interaction between the reference flight plan and the added or modified at least one environment object or context object;

if the modification to the set of objects involves the interaction, create a functional object symbolizing the interaction.

9. The system as claimed in claim 8, wherein the added or modified at least one environment object or context object is an added or modified closed surface, and the at least one computing unit is configured so as to:

check whether the modification of the set of objects involves the reference flight plan moving to the added or modified closed surface;

if the modification of the set of objects involves the reference flight plan moving to the added or modified closed surface, create a pseudo-point at where the flight plan enters the added or modified closed surface, and a pseudo-point at where the flight plan leaves the added or modified closed surface.

10. The system as claimed in claim 8, wherein the at least one computing unit is configured, upon receipt of the modification to the set of objects comprising the deletion of the at least one environment object or context object, so as to:

check whether the modification to the set of objects involves deleting the interaction between the reference flight plan and the deleted at least one environment object or context object;

if the modification to the set of objects involves deleting the interaction, delete a functional object symbolizing the interaction.

11. The system as claimed in claim 1, wherein the at least one computing unit is configured so as to code an object prior to sending a message, and to decode an object following the receipt of a message, the coding of the object comprising:

a code section comprising a predefined code defining the type of object, and for each of the attributes of the object, a predefined code defining the type of the attribute;

an alphanumeric string defining the associated value for each of the attributes.

12. The system as claimed in claim 1, wherein the at least one computing unit is configured so as to code a modification to the reference flight plan prior to sending a message, and to decode a modification to the reference flight plan following the receipt of a message, the coding of the reference flight plan modification comprising:

a code section comprising a predefined code defining a modification to the reference flight plan, and for each of the modified flight plan functions, a predefined code defining the type of function;

an alphanumeric string defining the modified waypoints and the associated parameter values for each of the functions.

13. The system as claimed in claim 11, wherein the at least one computing unit is configured, upon receipt of the modification to the set of objects via the at least one input interface, so as to:

generate the display of the modification;

send, via the at least one communication port, a message to the at least one second system containing the first description of the modification;

receive, from the at least one second system, a message containing an indication of the rejection of the modification, or the second description of the modification;

if the message received from the at least one second system is a rejection message, or if the first and the second description are different, cancel the modification;

otherwise, validate the modification;

and wherein:

the modification to the set of objects comprises a first and a second modification to the set of objects represented respectively in a first and a second coding of an object or of a modification to the reference flight plan;

the at least one computing unit is configured so as to check whether the first and the second modification are identical by checking whether the first and second codings are identical.

14. The system as claimed in claim 1, wherein:

the at least one communication port is configured so as to communicate with the at least one second system comprising a plurality of second systems;

the computing unit is configured, upon receipt, via the at least one communication port, of the message indicating the description of the modification, and in the event of validation, to send, via the at least one communication port, to each of the second systems of the plurality, the message containing the second description of the modification.

15. The first system of claim 1, wherein the at least one computing unit is further configured, upon receipt, via the at least one communication port, of the message indicating the first description of the modification to the set of objects, so as to:

generate the display of the modification; and send, via the at least one communication port, in response to a rejection of the modification via the at least one input interface, a message to the at least one second system containing-a message to the at least one second system containing an indication of the rejection of the modification.

16. A computer-implemented method comprising:

receiving, via at least one communication port of a first system, configured so as to communicate with at least one second system, a message indicating a first description of a modification to a set of objects comprising a reference flight plan of an aircraft and at least one environment object or context object;

displaying the modification on at least one display device of the first system;

sending, via the at least one communication port, in response to a validation of the modification via the at last one input interface, a message to the at least one second system containing a second description of said modification.

17. A computer program product comprising program code instructions stored on a computer-readable medium of a computer, the program code instructions being configured, when the computer program product is executed on the computer, so as to cause the computer to:

receive, via at least one communication port of a first system, configured so as to communicate with at least one second system, a message indicating a first description of a modification to a set of objects comprising a reference flight plan of an aircraft and at least one environment object or context object;

display the modification on at least one display device of the first system;

send, via the at least one communication port, in response to a validation of the modification via the at last one input interface, a message to the at least one second system containing a second description of said modification.

* * * * *